(12) United States Patent
Chang et al.

(10) Patent No.: US 11,791,705 B1
(45) Date of Patent: Oct. 17, 2023

(54) MULTI-PHASE VOLTAGE CONVERTER WITH IDENTIFICATION CODES ASSIGNMENT

(71) Applicant: Monolithic Power Systems, Inc., Kirkland, WA (US)

(72) Inventors: Chiahsin Chang, Sammamish, WA (US); Chao Liu, Sunnyvale, CA (US); James Nguyen, Bellevue, WA (US); Francis Yu, Sunnyvale, CA (US); Huichun Dai, Hangzhou (CN); Fangyu Zhang, Hangzhou (CN)

(73) Assignee: Monolithic Power Systems, Inc., Kirkland, WA (US)

( * ) Notice: Subject to any disclaimer, the term of this patent is extended or adjusted under 35 U.S.C. 154(b) by 16 days.

(21) Appl. No.: 17/839,631

(22) Filed: Jun. 14, 2022

(51) Int. Cl.
  *H02M 1/32* (2007.01)
  *H02M 1/00* (2006.01)
  *H02M 1/084* (2006.01)

(52) U.S. Cl.
  CPC ....... *H02M 1/0043* (2021.05); *H02M 1/0009* (2021.05); *H02M 1/0041* (2021.05); *H02M 1/084* (2013.01); *H02M 1/327* (2021.05)

(58) Field of Classification Search
  CPC .. H02M 1/0043; H02M 1/327; H02M 1/0009; H02M 1/0041; H02M 1/084
  See application file for complete search history.

(56) References Cited

U.S. PATENT DOCUMENTS

| | | | |
|---|---|---|---|
| 9,184,651 B2 | 11/2015 | Nguyen | |
| 9,263,937 B2 | 2/2016 | Nguyen | |
| 9,780,640 B2 | 10/2017 | Nguyen | |
| 9,812,963 B1 | 11/2017 | Nguyen | |
| 10,270,343 B2 * | 4/2019 | Nguyen | H02M 3/1584 |
| 10,840,795 B1 | 11/2020 | Nguyen | |
| 2015/0061630 A1 * | 3/2015 | Xu | H02M 1/36 323/283 |

OTHER PUBLICATIONS

U.S. Appl. No. 17/398,247, filed Aug. 10, 2021, James Nguyen.

* cited by examiner

*Primary Examiner* — Adolf D Berhane
(74) *Attorney, Agent, or Firm* — Perkins Coie LLP

(57) ABSTRACT

A multi-phase voltage converter has a plurality of integrated circuits (ICs), and a controller. Each IC has a power switch, a monitoring pin and a current sense pin. The power switch is controlled to convert an input voltage to an output voltage. The current sense pin is capable of providing a current sense signal representative of a current flowing through the power switch. The controller is capable of providing a clock signal via the monitoring pin, and provides a plurality of data signals via the current sense pin of the plurality of ICs. Each of the plurality of ICs is assigned an identification code based on the clock signal and one of the plurality of data signals.

20 Claims, 10 Drawing Sheets

US 11,791,705 B1

MULTI-PHASE VOLTAGE CONVERTER WITH IDENTIFICATION CODES ASSIGNMENT

TECHNICAL FIELD

The present invention generally refers to electrical circuits, and more particularly but not exclusively refers to multi-phase voltage converter with identification codes assignment.

BACKGROUND

In power conversion applications, an interleaved multi-phase voltage converter is widely used in large power and large current condition since the interleaved multi-phase voltage converter may be able to provide a large output current with small current ripples, optimized thermal and power distributions.

Traditionally, the interleaved multi-phase voltage converter has a plurality of phases coupled in parallel and a controller. Each phase may provide a temperature information through a monitoring pin VTEMP, and the controller has the monitoring pin VTEMP coupled to the monitoring pin VTEMP of each phase at the same time. Thus, the controller monitors a highest temperature among the plurality of phases of the interleaved multi-phase voltage converter. However, individual temperature cannot be obtained from the traditional interleaved multi-phase voltage converter.

SUMMARY

Embodiments of the present invention are directed to a multi-phase voltage converter, comprising a plurality of integrated circuits (ICs) that each provides a phase of the multi-phase voltage converter and a controller. Each of the plurality of ICs comprises a power switch, a monitoring pin, a power supply pin, and a current sense pin. The current sense pin is capable of providing a current sense signal representative of a current flowing through the power switch. The power supply pin is configured to receive an input voltage, and the power switch is configured to be turned ON and OFF to convert the input voltage to an output voltage. The controller has a monitoring pin and a plurality of multiplex pins. The monitoring pin of the controller is coupled to the monitoring pin of each of the plurality of ICs. The plurality of multiplex pins are coupled to the current sense pin of the plurality of ICs. The controller is capable of providing a clock signal via the monitoring pin, and providing a plurality of data signals via the plurality of multiplex pins, and the controller is configured to assign a plurality of identification codes for the plurality of ICs based on the clock signal and the plurality of data signals.

Embodiments of the present invention are further directed a method of assigning identification codes for a plurality of integrated circuits (ICs), wherein each of the plurality of ICs is configured to provide a phase of a multi-phase voltage converter. Providing a clock signal via a monitoring pin. Providing a plurality of data signals via a plurality of multiplex pins, the plurality of multiplex pins are capable of receiving a plurality of current sense signals representative of a plurality of current flowing through the plurality of ICs. And assigning a plurality of identification codes for the plurality of ICs based on the clock signal and the plurality of data signals.

Embodiments of the present invention are further directed to an integrated circuit (IC), comprising a power supply pin, a power switch, a monitoring pin, and a current sense pin. The power supply pin is configured to receive an input voltage. The power switch is configured to be turned ON and OFF to convert the input voltage to an output voltage. The monitoring pin is capable of receiving a clock signal. The current sense pin is capable of providing a current sense signal representative of a current flowing through the power switch, and the current sense pin is further capable of receiving a data signal. The IC is configured to be assigned an identification code based on the clock signal and the data signal.

Embodiments of the present invention are further directed to a controller for a multi-phase voltage converter. The controller comprises a monitoring pin, and a plurality of multiplex pins. The monitoring pin is coupled to a plurality of integrated circuits (ICs), each of the plurality of ICs provides a phase of the multi-phase voltage converter, and the monitoring pin is capable of providing a clock signal to all of the plurality of ICs. Each of the plurality of multiplex pins is coupled to one of the plurality of ICs to receive a current sense signal representative of a current flowing through the one of the plurality of ICs. The plurality of multiplex pins are further capable of providing a plurality of data signals to the plurality of ICs, and the controller is configured to assign a plurality of identification codes for the plurality of ICs based on the clock signal and the plurality of data signals.

These and other features of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
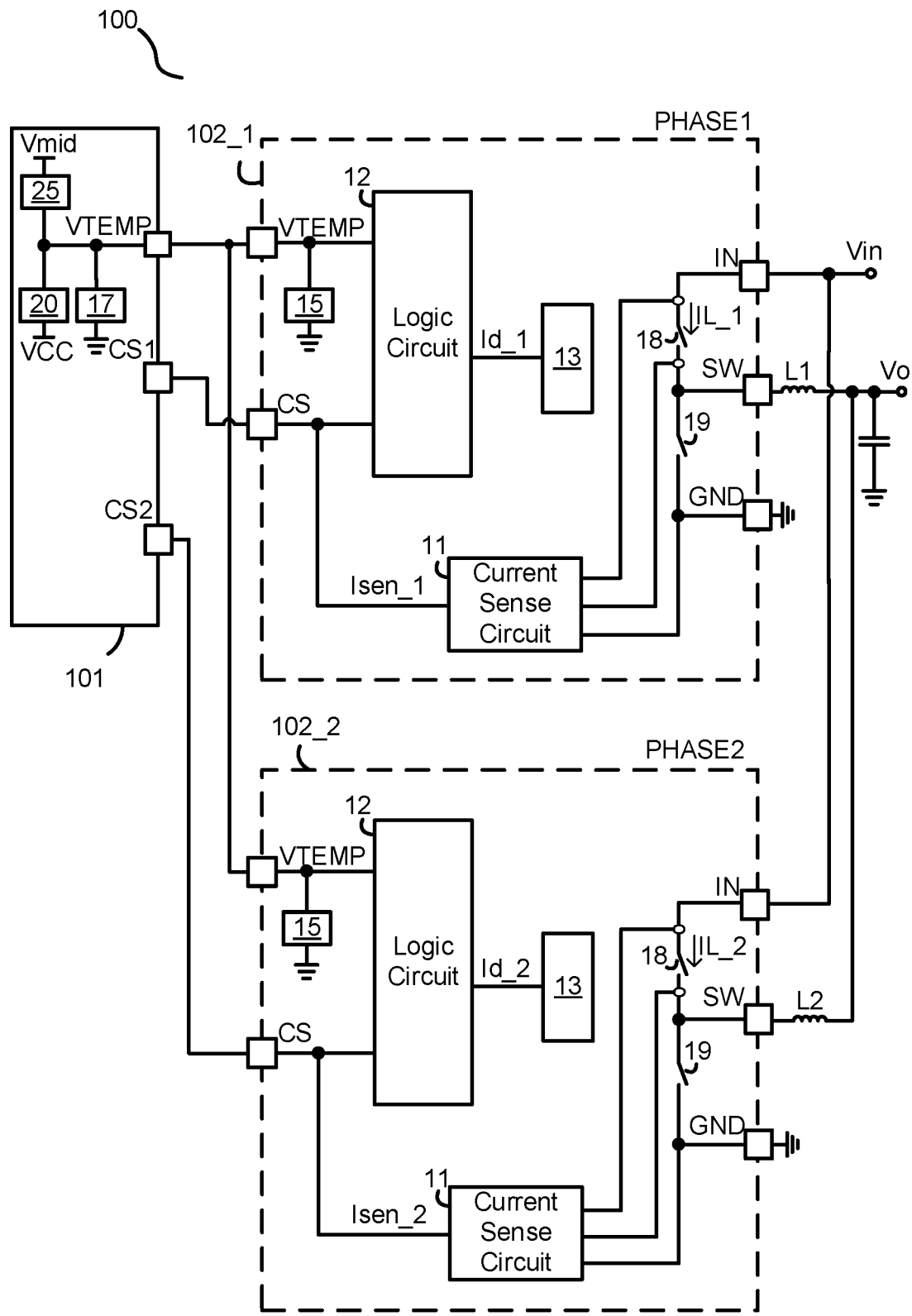
FIG. 1 schematically illustrates a multi-phase voltage converter diagram 100 in accordance with an embodiment of the present invention.

FIG. 1 schematically illustrates a multi-phase voltage converter diagram 100 in accordance with an embodiment of the present invention. In the example of FIG. 1, the multi-phase voltage converter 100 comprises two integrated circuits (ICs) 102 (e.g., 102_1 and 102_2) and a controller 101. As can be appreciated, the multi-phase voltage converter 100 may also be implemented with more ICs 102. In one example, each IC 102 provides a phase of the multi-phase voltage converter.

Each IC 102 comprises a power switch (e.g., a high-side switch 18 shown in FIG. 1), a monitoring pin VTEMP, a power supply pin IN, and a current sense pin CS. The current sense pin CS is capable of providing a current sense signal Isen representative of a current IL flowing through the power switch, i.e., flowing through a corresponding IC 102. The power supply pin IN is configured to receive an input voltage Vin, and the power switch is configured to be turned ON and OFF to convert the input voltage Vin to an output voltage Vo. As shown in FIG. 1, the current sense pin CS of the IC 102_1 is capable of providing a current sense signal Isen_1 representative of a current IL_1 flowing through the IC 102_1. The current sense pin CS of the IC 102_2 is capable of providing a current sense signal Isen_2 representative of a current IL_2 flowing through the IC 102_2.

The controller 101 has the monitoring pin VTEMP coupled to the monitoring pin VTEMP of each IC 102, and a plurality of multiplex pins (e.g., CS1 and CS2) coupled to the current sense pin CS of the ICs 102. As shown in FIG. 1, the monitoring pin VTEMP of the controller 101 is coupled to the monitoring pin VTEMP of the IC 102_1 and the monitoring pin VTEMP of the IC 102_2. The multiplex pin CS1 of the controller 101 is coupled to the current sense pin CS of the IC 102_1. The multiplex pin CS2 of the controller 101 is coupled to the current sense pin CS of the IC 102_2. In one embodiment, the controller 101 is capable of providing a clock signal CLOCK via the monitoring pin VTEMP, and providing a plurality of data signals (e.g., DATA1 and DATA2) via the plurality of multiplex pins. Each IC 102 is assigned an identification code Id based on the clock signal CLOCK and one of the plurality of data signals. For example, the controller 101 is configured to assign an identification code Id_1 for the IC 102_1 based on the clock signal CLOCK and the data signal DATA1, and the controller 101 is configured to assign an identification code Id_2 for the IC 102_2 based on the clock signal CLOCK and the data signal DATA2. After assigning the identification codes, the controller 101 receives a plurality of current sense signals via the plurality of multiplex pins, e.g., receives the current sense signal Isen_1 via the multiplex pin CS1, and receives the current sense signal Isen_2 via the multiplex pin CS2. In one embodiment, the controller 101 is configured to force the monitoring pin VTEMP of the controller 101 and the plurality of multiplex pins to be at a first status before sending the clock signal CLOCK and the plurality of data signals. In one embodiment, the controller 101 is configured to force the monitoring pin VTEMP of the controller 101 and the plurality of multiplex pins to be at a second status after sending the clock signal CLOCK and the plurality of data signals. The first status may comprise a high voltage level, maintaining at the high voltage level for a first time period, or other suitable condition. The second status may comprise a middle voltage level, maintaining at the middle voltage level for a second time period, or other suitable condition.

In some examples, a voltage level between a high threshold voltage (e.g. 2V) and the voltage source VCC (e.g. 3.3V) is considered as the high voltage level, a voltage level between zero voltage (0 V) and a low threshold voltage (e.g. 0.7V) is considered as a low voltage level, and a voltage level between the high threshold voltage and low threshold voltage is considered as the middle voltage level.

In one embodiment, the controller 101 is further configured to providing a command ACQ via the monitoring pin VTEMP to all of the ICs 102 to execute a preset program, e.g., calling a specific one of the ICs 102 to report an information back to the controller 101, calling all of the ICs 102 to report the information, or stopping all of the ICs 102 to report the information and detecting if a bus coupled between the monitoring pin VTEMP of the controller and the monitoring pin VTEMP of each IC 102 is abnormal. If the command ACQ matches with the identification code Id_x of the corresponding IC 102, the corresponding IC 102 is configured to report the information via the monitoring pin VTEMP, while the other of the ICs 102 are configured to stop reporting the information. That is the controller 101 receives the information of the corresponding IC 102, e.g., via the monitoring pin VTEMP. The information may comprise but is not limited to a temperature signal Tse representative of an individual temperature of the corresponding the IC 102. In the example of FIG. 1, the controller 101 further comprises a pull down circuit 17 coupled between the monitoring pin VTEMP and a reference ground, and a pull up circuit 20 coupled between the monitoring pin VTEMP and a voltage source VCC. The controller 101 is configured to pull in and out of the pull down circuit 17 and the pull up circuit 20 respectively to detect if a bus coupled between the monitoring pin VTEMP of the controller 101 and the monitoring pin VTEMP of each IC 102 is abnormal. In the example of FIG. 1, the controller 101 further comprises a pull up circuit 25 coupled between the monitoring pin VTEMP and a middle voltage Vmid.

In one embodiment, each IC 102 receives the clock signal CLOCK via the monitoring pin VTEMP, receives the data signal DATAx via the current sense pin CS, and obtains the identification code Id based on the clock signal CLOCK and the data signal DATAx. Each IC 102 is further configured to receive the command ACQ via the monitoring pin VTEMP after obtaining the corresponding identification code Id_x, and report the information via the monitoring pin VTEMP if the command ACQ matches with the corresponding identification code Id_x.

Each IC 102 further comprises a pin SW and a pin GND. The pin SW is coupled to one terminal of an inductor Lx (e.g., L1 for IC 102_1, L2 for IC 102_2), and another terminal of the inductor Lx is configured to provide the output voltage Vo. The pin GND is coupled to the reference ground. In the example shown in FIG. 1, each IC comprises the high-side switch 18, and a low-side switch 19. The high-side switch 18 has a first terminal coupled to the pin IN to receive the input voltage Vin, and a second terminal coupled to the pin SW. The low-side switch 19 has a first terminal coupled to the second terminal of the high-side switch 18, and a second terminal coupled to the pin GND. In one example, the high-side switch 18 and the low-side switch 19 may be transistors, such as a MOSFET (Metal Oxide Semiconductor Field Effect Transistor), JFET (Junction Field Effect Transistor), VFET (Vertical Channel Field Effect Transistor) and so on. One with ordinary skill in the art should understand, that other suitable circuit topology comprising at least one power switch could also be adopted without detracting spirits of the embodiments.

In the example of FIG. 1, each IC 102 further comprises a current sense circuit 11. The current sense circuit 11 is configured to provide the current sense signal Isen_x (e.g., Isen_1 for IC 102_1, Isen_2 for IC 102_2), based on the current IL_x (e.g., IL_1 for 102_1, IL_2 for 102_2) flowing through the at least one power switch, e.g., the high-side switch 18 or the low-side switch 19. In another example, the current sense signal Isen_x could also represent a current flowing through the inductor Lx (i.e., L1 for IC 102_1, and L2 for IC 102_2). In the example of FIG. 1, each IC 102 further comprises a logic circuit 12, coupled to the monitoring pin VTEMP and the current sense pin CS. The logic circuit 12 is configured to obtain the identification code Id_x based on the clock signal CLOCK and the data signal DATAx. In one embodiment, the identification code Id_1 is stored in a memory 13 (e.g., a register) of the IC 102_1, the identification code Id_2 is stored in the memory 13 of the IC 102_2. In the example of FIG. 1, each IC 102 further comprises a pull down circuit 15 coupled between the monitoring pin VTEMP and the reference ground.

In the example of FIG. 1, each IC 102 can be assigned the identification code Id_x separately without extra pin added, and each IC 102 can be called separately by the controller 101 to report the information, e.g., the individual temperature. In this way, the controller 101 can perform dynamic thermal balance, individual healthy check, and other related functions easily.

Figure 2:
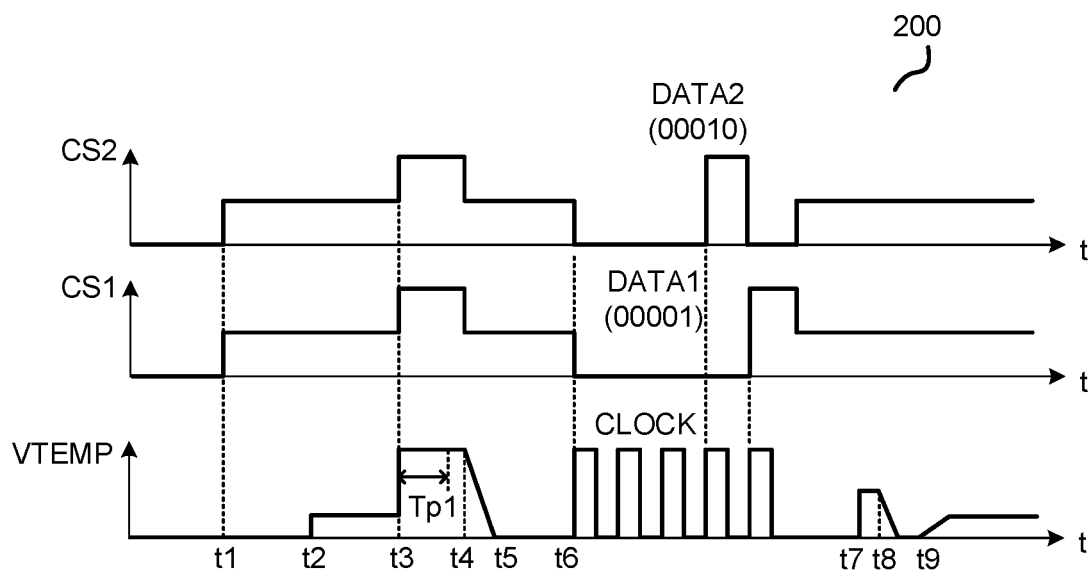
FIG. 2 shows a timing diagram 200 of the signals of the multi-phase voltage converter 100 for identification codes assignment in accordance with an embodiment of the present invention.

FIG. 2 shows a timing diagram 200 of the signals of the multi-phase voltage converter 100 for identification codes assignment in accordance with an embodiment of the present invention. FIG. 2 shows, from top to bottom, a voltage on the multiplex pin CS2, a voltage on the multiplex pin CS1, and a voltage on the monitoring pin VTEMP.

At time t1, when the controller 101 is ready, the multiplex pins CS1 and CS2 are forced to be at a middle voltage level. At time t2, when the ICs 102 are ready, the voltage on the monitoring pin VTEMP is provided by the ICs 102. At time t3, the controller 101 forces the monitoring pin VTEMP, and the multiplex pins CS1 and CS2 to be at the first status, e.g., maintaining at the high voltage level for at least a time period Tp1 (e.g., 10 us), to initial identification codes assignment. In one example, after the time period Tp1, the controller 101 keeps the monitoring pin VTEMP high impedance, and all the ICs 102 stops reporting the information via the monitoring pin VTEMP temporarily. During time t4-t5, if there is no fault, then the monitoring pin VTEMP is pulled down by the pull down circuit 15 of each of the ICs 102 as one example. During time t6-t7, the controller 101 sends the clock signal CLOCK via the monitoring pin VTEMP, the data signal DATA1 via the multiplex pin CS1 and the data signal DATA2 via the multiplex pin CS2. In the example shown in FIG. 2 the clock signal CLOCK has five pulses. In other examples, the clock signal CLOCK may have more or less pulses. Then the IC 102_1 obtains the identification code Id_1 based on the data signal DATA1 and the clock signal CLOCK, and the IC 102_2 obtains the identification code Id_2 based on the data signal DATA2 and the clock signal CLOCK. In the example shown in FIG. 2, the identification code Id_1 is 00001 and the identification code Id_2 is 00010. In other examples, the identification codes are not limited by the example shown in FIG. 2. At time t7, after sending the clock signal CLOCK and the data signals DATA1 and DATA2, the controller 101 forces the monitoring pin VTEMP and the multiplex pins CS1 and CS2 to be at the second status, e.g., at the middle voltage level. Then at time t8, the controller 101 releases the monitoring pin VTEMP and the multiplex pins CS1-CS2. During time t8-t9, if there is no fault, then the monitoring pin VTEMP is pulled down by the pull down circuit 15 of each of the ICs 102 for example. At time t9, the voltage on the monitoring pin VTEMP is provided by the ICs 102 again, the multiplex pin CS1 receives the current sense signal Isen_1 from the IC 102_1, and the multiplex pin CS2 receives the current sense signal Isen_2 from the IC 102_2.

Figure 3:
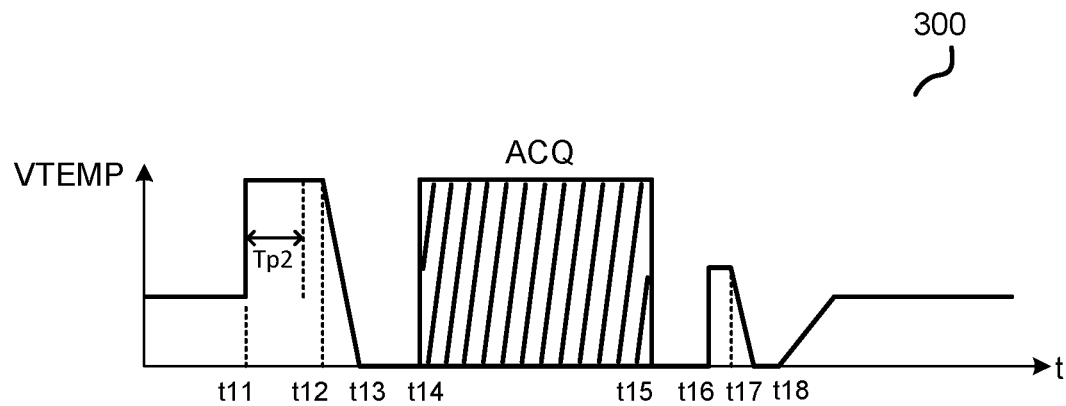
FIG. 3 shows a timing diagram 300 of the voltage on the monitoring pin VTEMP of the controller 101 for calling a specific one of the ICs 102 or all of the ICs 102 in accordance with an embodiment of the present invention.

FIG. 3 shows a timing diagram 300 of the voltage on the monitoring pin VTEMP of the controller 101 for calling the specific one the ICs 102 or all of the ICs 102 in accordance with an embodiment of the present invention.

At time t11, the controller 101 forces the monitoring pin VTEMP to be at the first status, e.g., at the high voltage level for at least a time period Tp2 (e.g., 10 us) to start a calling program. In one embodiment, during the calling program, the multiplex pin CS1 keeps receiving the current sense signal Isen_1 from the IC 102_1, and the multiplex pin CS2 keeps receiving the current sense signal Isen_2 from the IC 102_2. In one example, after the time period Tp2, the controller 101 keeps the monitoring pin VTEMP high impedance, and all the ICs 102 stops reporting the information via the monitoring pin VTEMP temporarily. During time t12-t13, if there is no fault, then the monitoring pin VTEMP is pulled down by the pull down circuit 15 of each of the ICs 102 as one example. During time t14-t15, the controller 101 sends the command ACQ via the monitoring pin VTEMP.

In one embodiment, the command ACQ is capable of selecting the specific one of the ICs 102 to report the information back to the controller 101, e.g., via the monitoring pin VTEMP, while remaining of the plurality of ICs 102 stops reporting. The command ACQ, for example but be not limited to, may comprise a plurality of pulses. In one embodiment, when the command ACQ matches with the identification code Id_x of the corresponding IC 102_x (e.g., a number of the pulses equals the identification code Id_x), the corresponding IC 102_x is called to report the information back to the controller 101. When the command ACQ matches with a predetermined code Id_all (e.g., the number of the pulses equals the predetermined code Id_all), all of the ICs 102 are called to report the information back to the controller 101 at the same time.

At time t16, after sending the command ACQ, the controller 101 forces the monitoring pin VTEMP to be at the second status, e.g., at the middle voltage level. Then at time t17, the controller 101 releases the monitoring pin VTEMP. During time t17-t18, if there is no fault, then the monitoring pin VTEMP is pulled down by the pull down circuit 15 of each of the ICs 102 for example. From time t18, the specific one of the ICs 102 is called, or all of the ICs 102 are called, e.g., to send the information back to the controller via the monitoring pin VTEMP.

Figure 4:
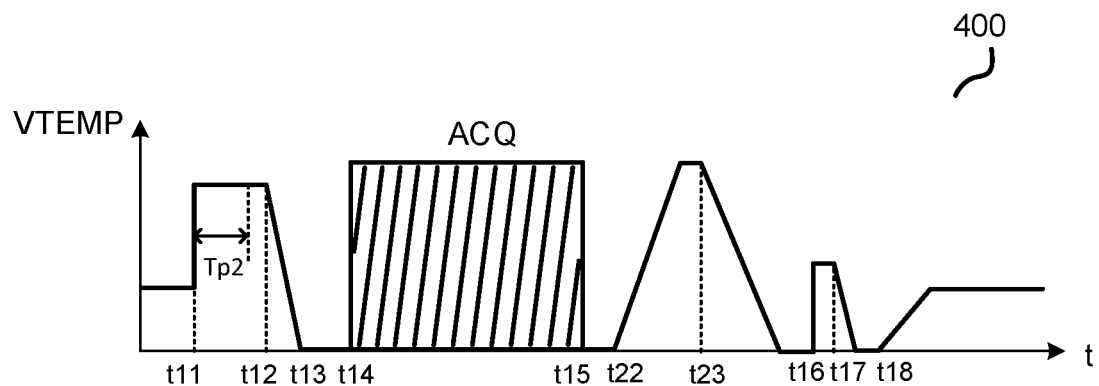
FIG. 4 shows a timing diagram 400 of the voltage on the monitoring pin VTEMP of the controller 101 for fault detecting in accordance with an embodiment of the present invention.

FIG. 4 shows a timing diagram 400 of the voltage on the monitoring pin VTEMP of the controller 101 for fault detecting in accordance with an embodiment of the present invention.

In one example shown in FIG. 4, if the command ACQ matches with a predetermined code Id_bus_detect, then the controller 101 will execute a bus-detecting program. For example, the controller 101 will pull in and pull out the pull down circuit 17 and the pull up circuit 20 to detect if a bus coupled between the monitoring pin VTEMP of the controller 101 and the monitoring pin VTEMP of each IC 102 is high impedance, to detect if there is any unexpected fault on the bus. For example, at time t22, the controller 101 pulls in the pull up circuit 20 for a time period, and at time t23, the controller 101 pulls out the pull up circuit 20 and pulls in the pull down circuit 17 for a time period.

Figure 5:
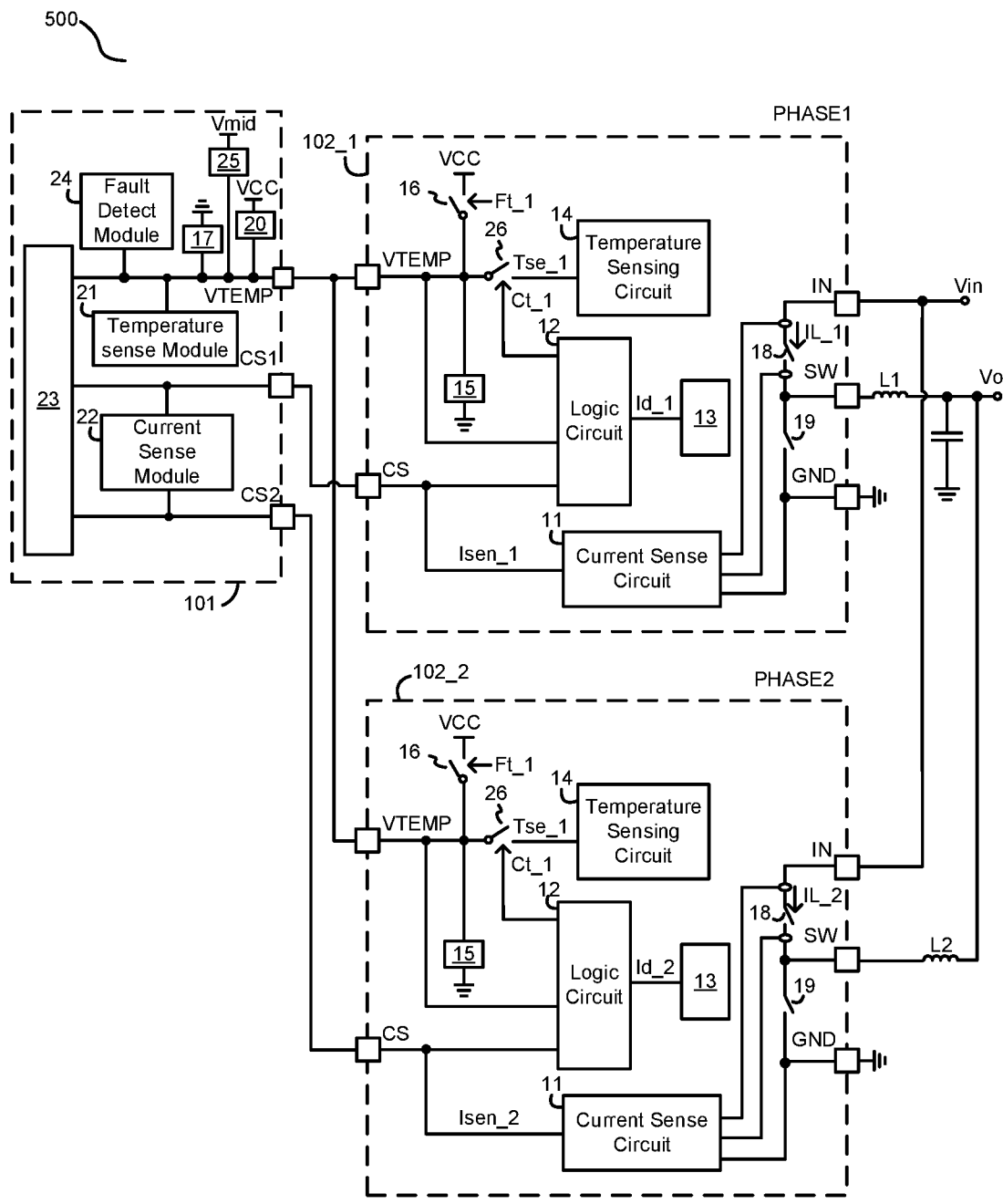
FIG. 5 schematically illustrates a multi-phase voltage converter diagram 500 in accordance with an embodiment of the present invention.

FIG. 5 schematically illustrates a multi-phase voltage converter diagram 500 in accordance with an embodiment of the present invention.

In FIG. 5, each IC 102 further comprises a temperature sensing circuit 14 coupled to the monitoring pin VTEMP. The temperature sensing circuit 14 is configured to sense an individual temperature of the corresponding IC 102 and provide the temperature signal Tse_x representative of the individual temperature Tse_x of the corresponding IC 102. In the example of FIG. 5, each IC 102 further comprises a switch 26. When the switch 26 is turned on, the temperature sensing circuit 14 is configured to report the temperature signal Tse_x to the monitoring pin VTEMP. When the switch 26 is turned off, the temperature sensing circuit 14 is configured to stop reporting the temperature signal Tse_x to the monitoring pin VTEMP. The logic circuit 12 is further configured to provide a control signal Ct_x to control the switch 26 based on the command ACQ. One with ordinary skill in the art should understand that the switch 26 is just an example and could be replaced by other suitable circuit, which is capable of controlling whether the temperature signal Tse_x is reported.

In one embodiment, each IC 102 further comprises a pull up switch 16. When there is any fault occurs, the pull up switch 16 is turned on by a fault indicating signal Ft_x, and the monitoring pin VTEMP is connected to the voltage source VCC through the pull up switch 16.

As shown in FIG. 5, the controller 101 further comprises a current sense module 22, and a control module 23. The current sense module 22 is coupled to the multiplex pins CS1-CS2 to receive the current sense signals Isen_1 and Isen_2, and is configured to provide phase current signals I-phase1, I-phase2, and a total current signal Imon representative of a sum of the current flowing through each of the ICs 102 based on the current sense signals Isen_1 and Isen_2. The control module 23 is configured to send the clock signal CLOCK to the ICs 102 via the monitoring pin VTEMP, send the data signal DATA1 to the IC 102_1 via the multiplex pin CS1, and send the data signal DATA2 to the IC 102_2 via the multiplex pin CS2. Moreover, after assigning the identification codes, the control module 23 is configured to send the command ACQ via the monitoring pin VTEMP. In one embodiment, the control module 23 is further configured to control status of the monitoring pin VTEMP and status of the multiplex pins CS1-CS2.

As shown in FIG. 5, the controller 101 further comprises a temperature sense module 21. After the identification codes assignment, the temperature sense module 21 is configured to record a voltage at the monitoring pin VTEMP as a maximum temperature signal T_max representative of a maximum temperature among the ICs 102, or one of phase temperature signals T_phase 1, T_phase 2, representative of the individual temperature of the IC 102_1 and 102_2 respectively.

As shown in FIG. 5, the controller 101 further comprises a fault detect module 24. The fault detect module 24 is configured to check if there is any fault occurs on the ICs 102 and on the bus coupled between the monitoring pin VTEMP of the controller 101 and the monitoring pin VTEMP of each IC 102 based on the voltage on the monitoring pin VTEMP, and provide a fault-indicating signal Fault.

Figure 6:
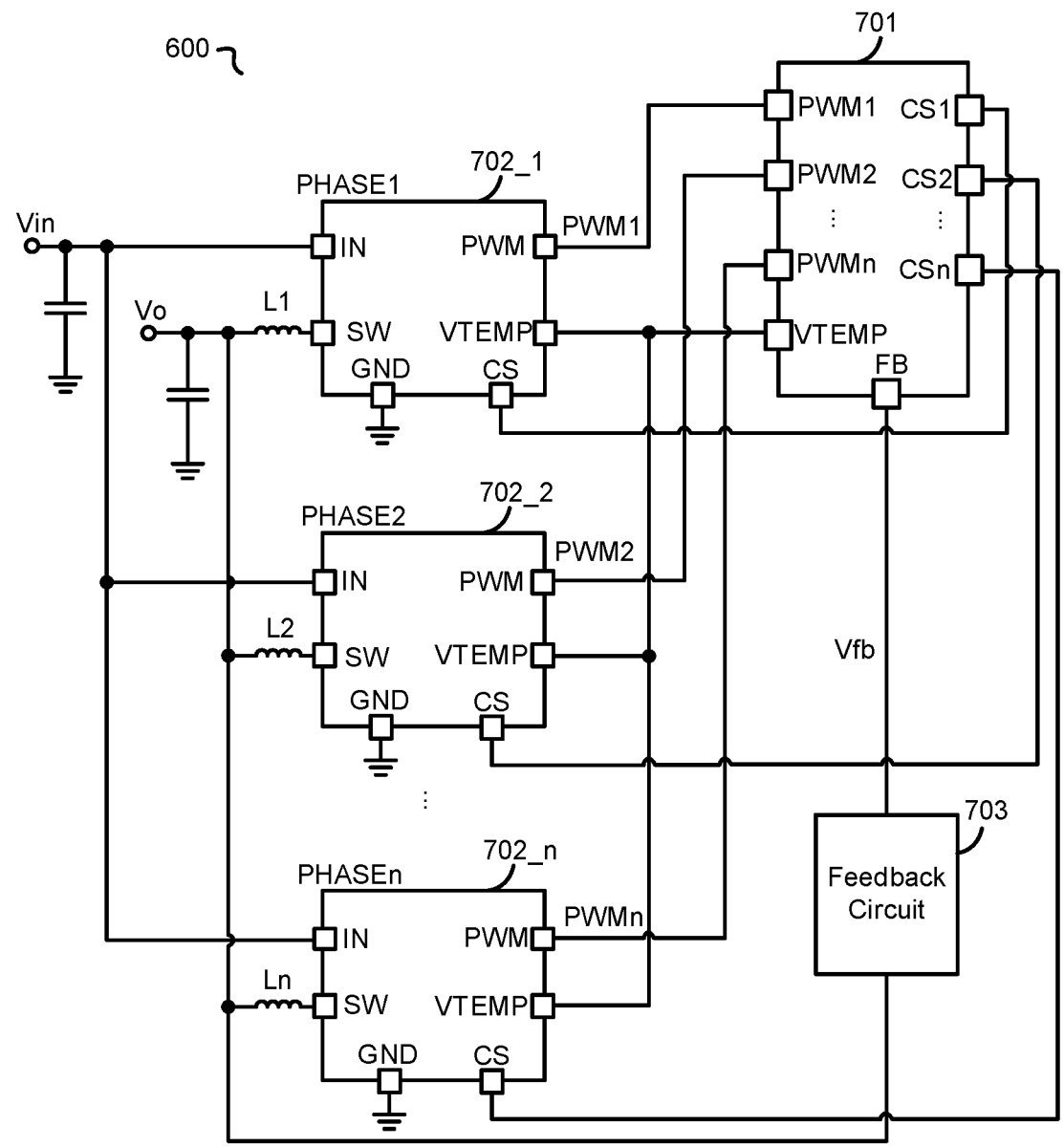
FIG. 6 schematically illustrates a multi-phase voltage converter 600 in accordance with an embodiment of the present invention.

FIG. 6 schematically illustrates a multi-phase voltage converter 600 in accordance with an embodiment of the present invention. In the example of FIG. 6, the multi-phase voltage converter 600 comprises a plurality of ICs 702 (i.e., 702_1, 702_2 . . . 702_n), and a controller 701, where n is an integer larger than one.

In the example of FIG. 6, the plurality of ICs 702 are configured to form a multi-phase switching circuit, and each IC 702 provides a phase of the multi-phase converter 600. As show in FIG. 6, each IC 702 further comprises a switching control pin PWM to receive a switching control signal PWMx. In the example of FIG. 6, the controller 701 has a plurality of switching control pins PWM1-PWMn configured to provide a plurality of switching control signals PWM1-PWMn, and a feedback pin FB configured to receive a feedback signal Vfb. In one example, the multi-phase voltage converter 600 comprises a feedback circuit 703. The feedback circuit 703 is configured to provide the feedback signal Vfb based on the output voltage Vo.

Figure 7:
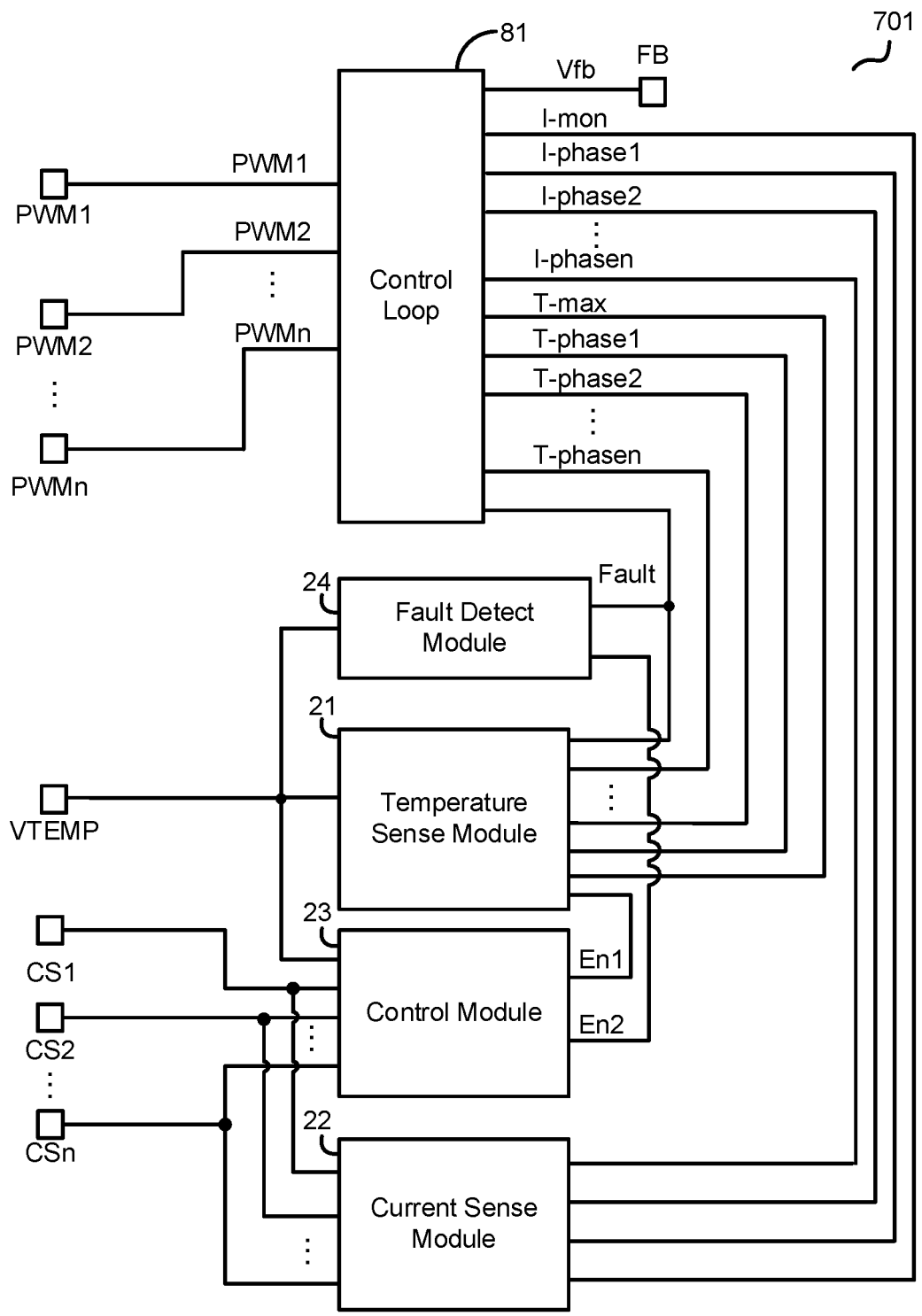
FIG. 7 schematically illustrates the controller 701 of the multi-phase voltage converter 600 shown in FIG. 6 in accordance with an embodiment of the present invention.

FIG. 7 schematically illustrates the controller 701 of the multi-phase voltage converter 600 shown in FIG. 6 in accordance with an embodiment of the present invention. FIG. 7 shows one example of the controller 701, one with ordinary skill in the art should understand that the detailed circuit structure of the controller 701 is not limited by the example shown in FIG. 7. In the example of FIG. 7, the controller 101 comprises the temperature sense module 21, the current sense module 22, the control module 23, and a control loop 81.

The control loop 81 is configured to receive the feedback signal Vfb representative of the output voltage Vo, the phase current signals I-phase1, I-phase2 . . . I-phasen, and the total current signal Imon, and is configured to provide the switching control signals PWM1-PWMn based on the output voltage Vo, the phase current signals I-phase1, 1-phase2 . . . 1-phasen, and the total current signal Imon. In one example, the control loop 81 is further configured to provide the switching control signals PWM1-PWMn based on the maximum temperature signal Tmax, and the phase temperature signals T-phase1, T-phase2 . . . T-phasen. In one example, the controller 701 further comprises the fault detect module 24, and the control loop 81 is configured to provide the switching control signals PWM1-PWMn further based on the fault-indicating signal Fault provided by the fault detect module 24. In one example, the control module 23 is further configured to provide an enable signal En1 to enable or disable the temperature sense module 21. In one example, the control module 23 is further configured to provide an enable signal EN2 to enable or disable the fault detect module 24.

Figure 8:
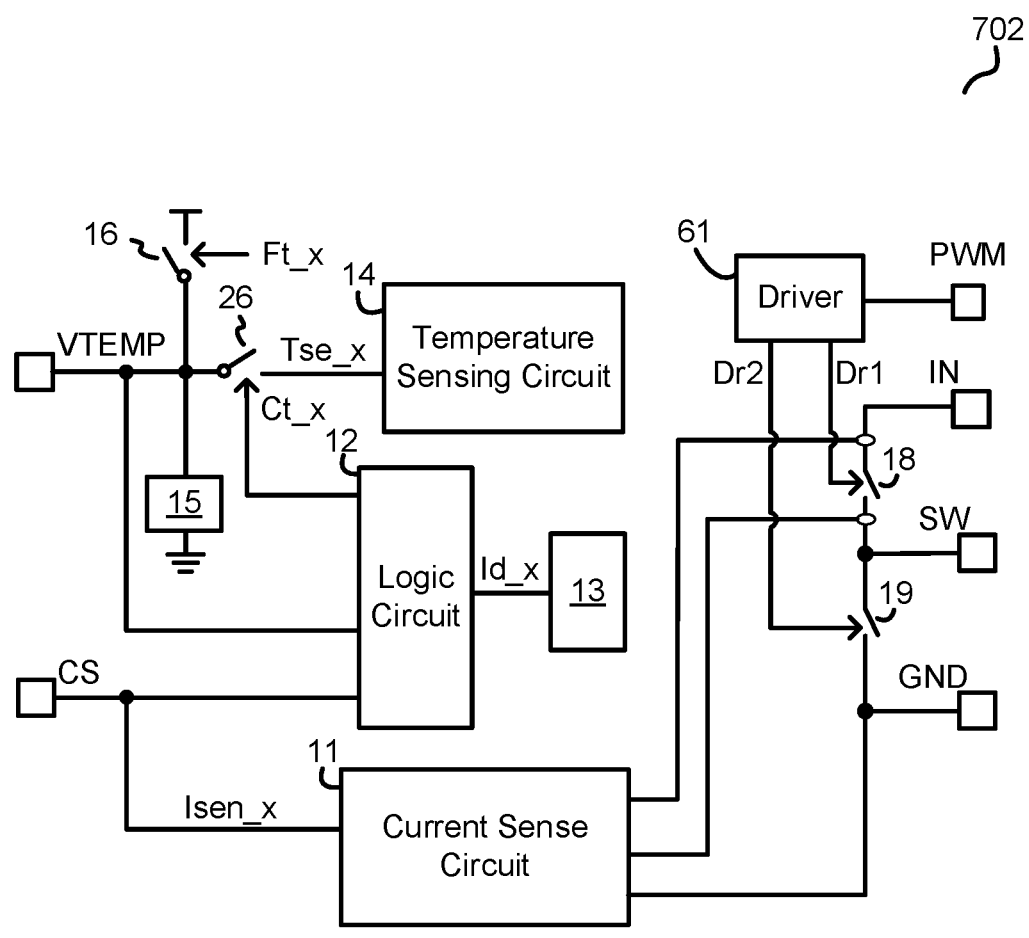
FIG. 8 schematically illustrates the IC 702 of the multi-phase voltage converter 800 shown in FIG. 8 in accordance with an embodiment of the present invention.

FIG. 8 schematically illustrates the IC 702 of the multi-phase voltage converter 800 shown in FIG. 8 in accordance with an embodiment of the present invention. FIG. 8 shows one example of the IC 702, one with ordinary skill in the art should understand that the detailed circuit structure of the IC 702 is not limited by the example shown in FIG. 8.

Compared with the IC 102, the IC 702 further comprises a driver 61. The driver 61 is coupled to the switching control pin PWM to receive the switching control signal PWM, and is configured to provide a drive signal Dr1 and a drive signal Dr2 based on the switching control signal PWM. The high-side switch 18 is configured to be turned ON and OFF by the drive signal Dr1. The low-side switch 19 is configured to be turned ON and OFF by the drive signal Dr2.

Figure 9:
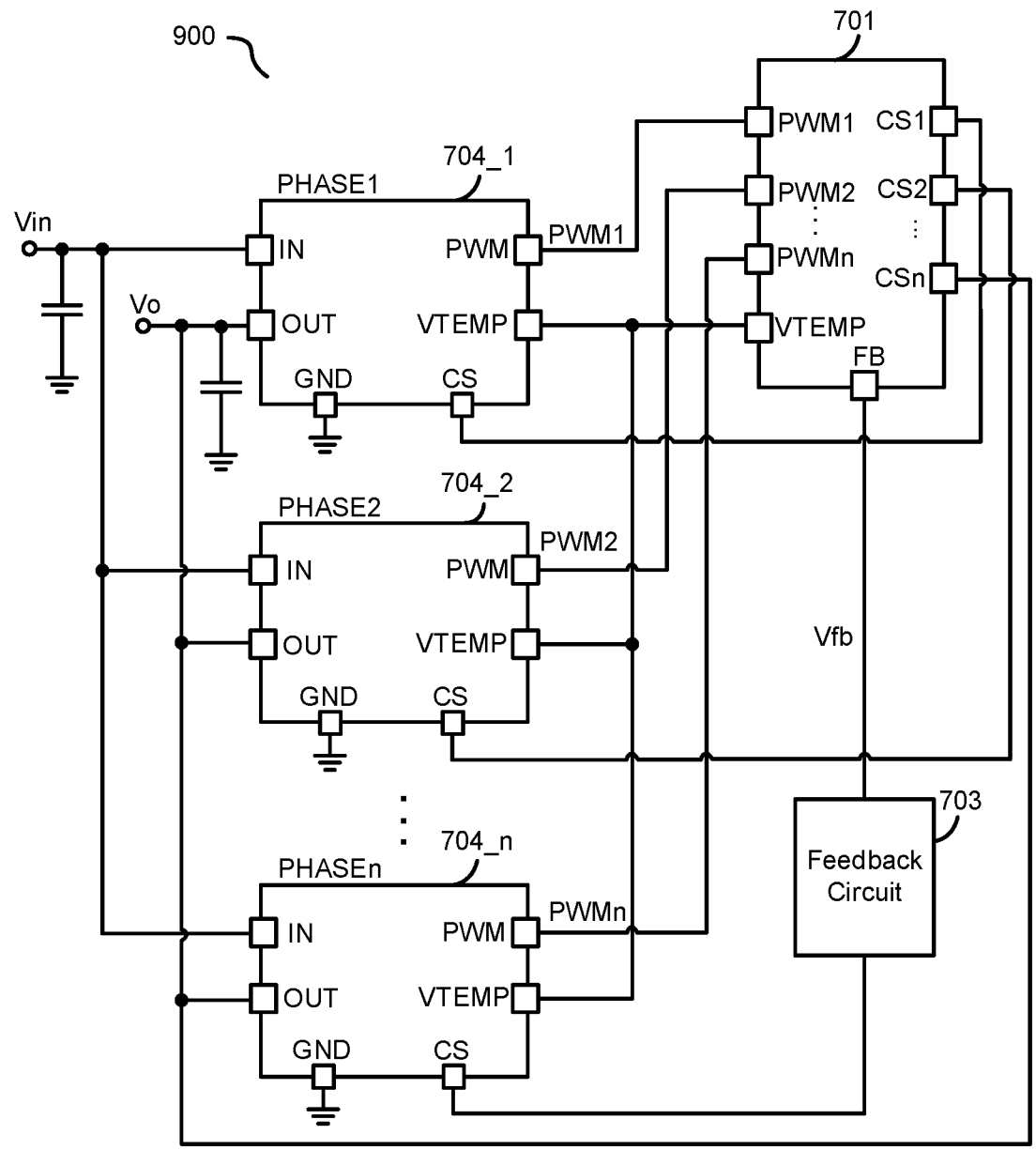
FIG. 9 schematically illustrates a multi-phase voltage converter 900 in accordance with an embodiment of the present invention.

FIG. 9 schematically illustrates a multi-phase voltage converter 900 in accordance with an embodiment of the present invention. In the example of FIG. 9, the multi-phase voltage converter 900 comprises a plurality of ICs 704 (i.e., 704_1, 704_2 . . . 704_n), and a controller 701, where n is an integer larger than one. In the example of FIG. 9, the plurality of ICs 704 are configured to form a multi-phase switching circuit, and each IC 704 provides a phase of the multi-phase converter 900. As show in FIG. 9, each IC 704 further comprises a pin OUT. The pin OUT of all of the ICs 704 are coupled together to provide the output voltage Vo.

Figure 10:
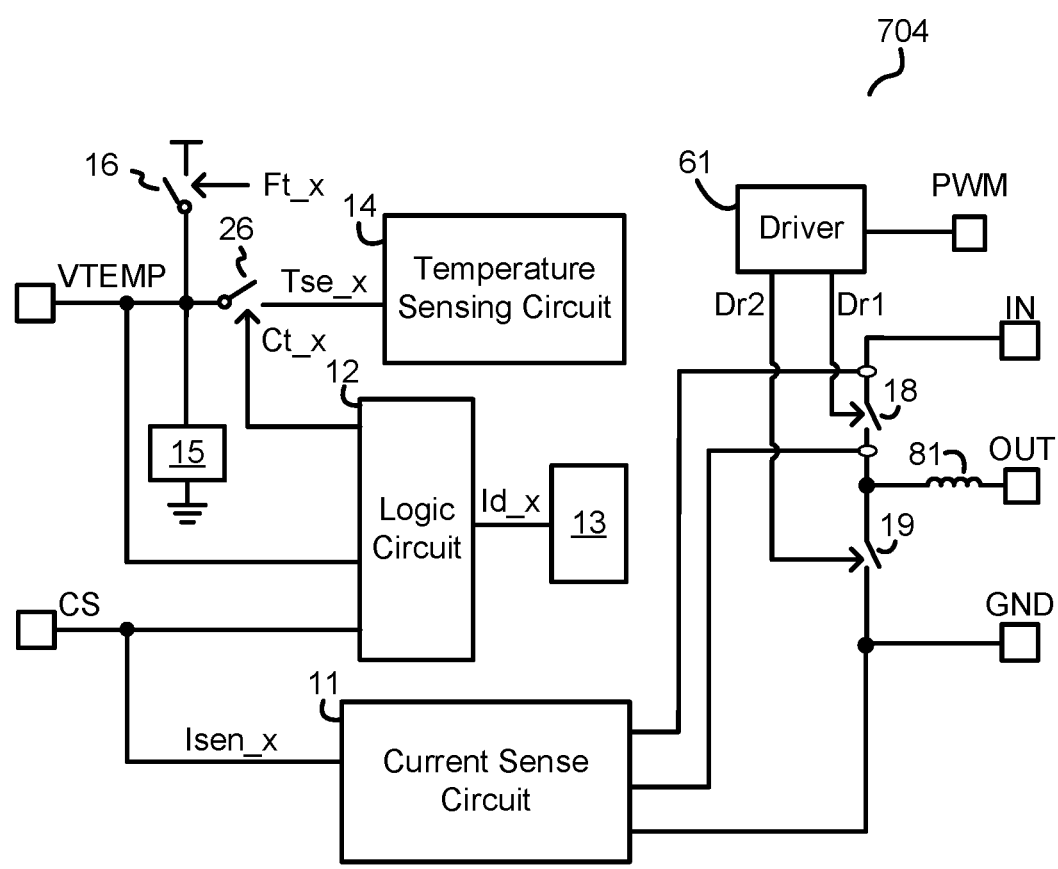
FIG. 10 schematically illustrates the IC 704 of the multi-phase voltage converter 900 shown in FIG. 9 in accordance with an embodiment of the present invention.

FIG. 10 schematically illustrates the IC 704 of the multi-phase voltage converter 900 shown in FIG. 9 in accordance with an embodiment of the present invention. FIG. 10 shows one example of the IC 704, one with ordinary skill in the art should understand that the detailed circuit structure of the IC 704 is not limited by the example shown in FIG. 10.

Compared with the IC 702, the IC 704 further comprises an inductor 81. The first terminal of the high-side switch 18 is coupled to the pin IN to receive the input voltage Vin, the second terminal of the high-side switch 18 is coupled to one terminal of the inductor 81, and the control terminal of the high-side switch is coupled to the driver 61 to receive the drive signal Dr1. Another terminal of the inductor 81 is coupled to the pin OUT. The first terminal of the low-side switch 19 is coupled to the second terminal of the high-side switch 18, the second terminal of the low-side switch 19 is coupled to the pin GND, and the control terminal of the low-side switch 19 is coupled to the driver 61 to receive the drive signal Dr2.

Figure 11:
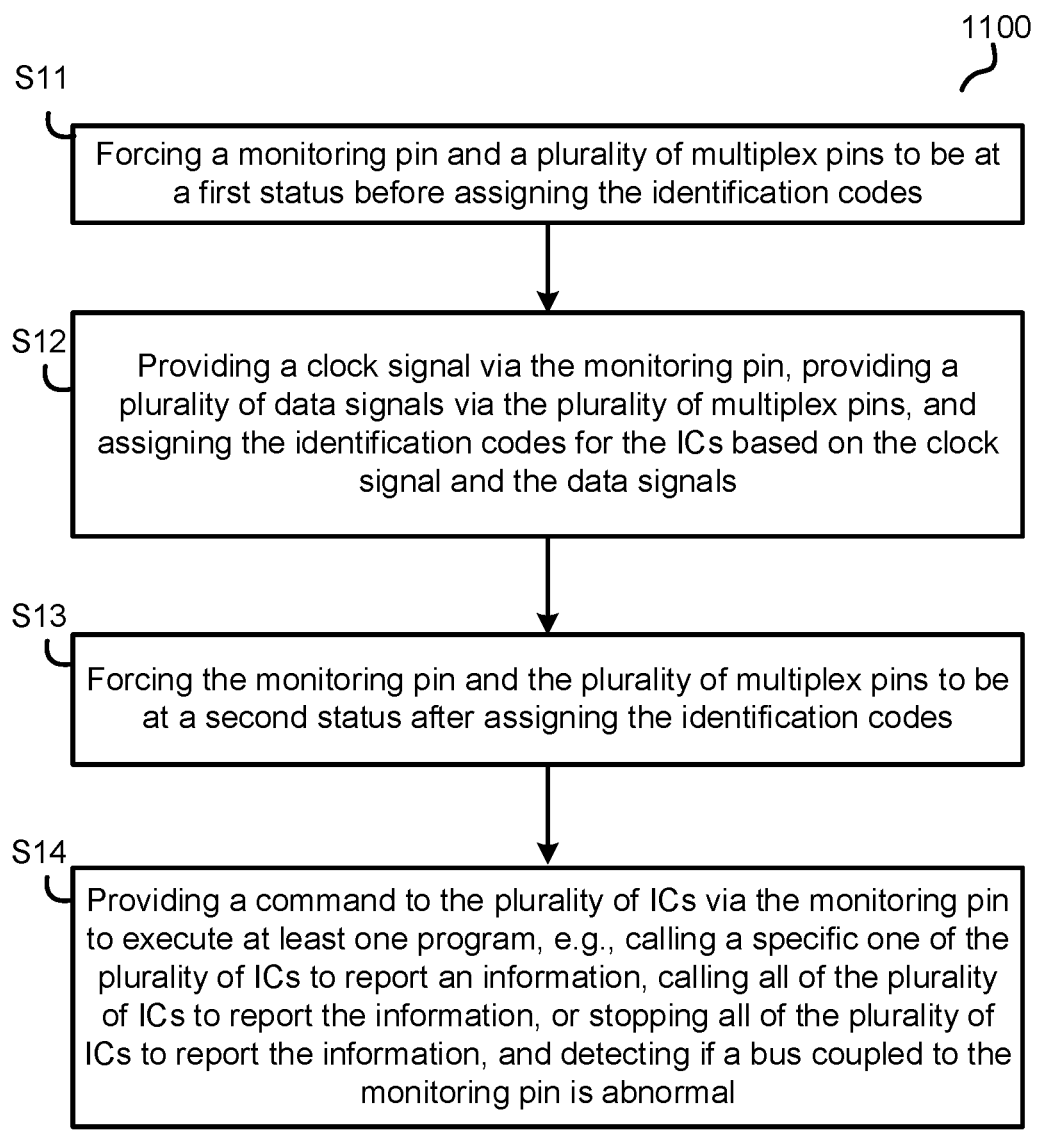
FIG. 11 illustrates a method 1100 of assigning an identification code for an integrated circuit (IC) in accordance with an embodiment of the present invention.

FIG. 11 illustrates a method 1100 of assigning identification codes for a plurality of integrated circuits (ICs) in accordance with an embodiment of the present invention. Each of the IC is configured to provide a phase of a multi-phase voltage converter. The method 1100 comprises steps S11-S14.

At step S11, forcing a monitoring pin and a plurality of multiplex pins to be at a first status before assigning the identification codes.

At step S12, providing a clock signal via the monitoring pin, providing a plurality of data signals via the plurality of multiplex pins, and assigning identification codes for the ICs based on the clock signal and the data signals. In one embodiment, each of the multiplex pins is capable of receiving a current sense signal representative of a current flowing through one of the ICs.

At step S13, forcing the monitoring pin and the plurality of multiplex pins to be at a second status after assigning the identification codes.

At step S14, providing a command to the plurality of ICs via the monitoring pin to execute at least one program, e.g., calling a specific one of the plurality of ICs to report an information, calling all of the plurality of ICs to report the information, or stopping all of the plurality of ICs to report the information, and detecting if a bus coupled to the monitoring pin is abnormal.

Figure 12:
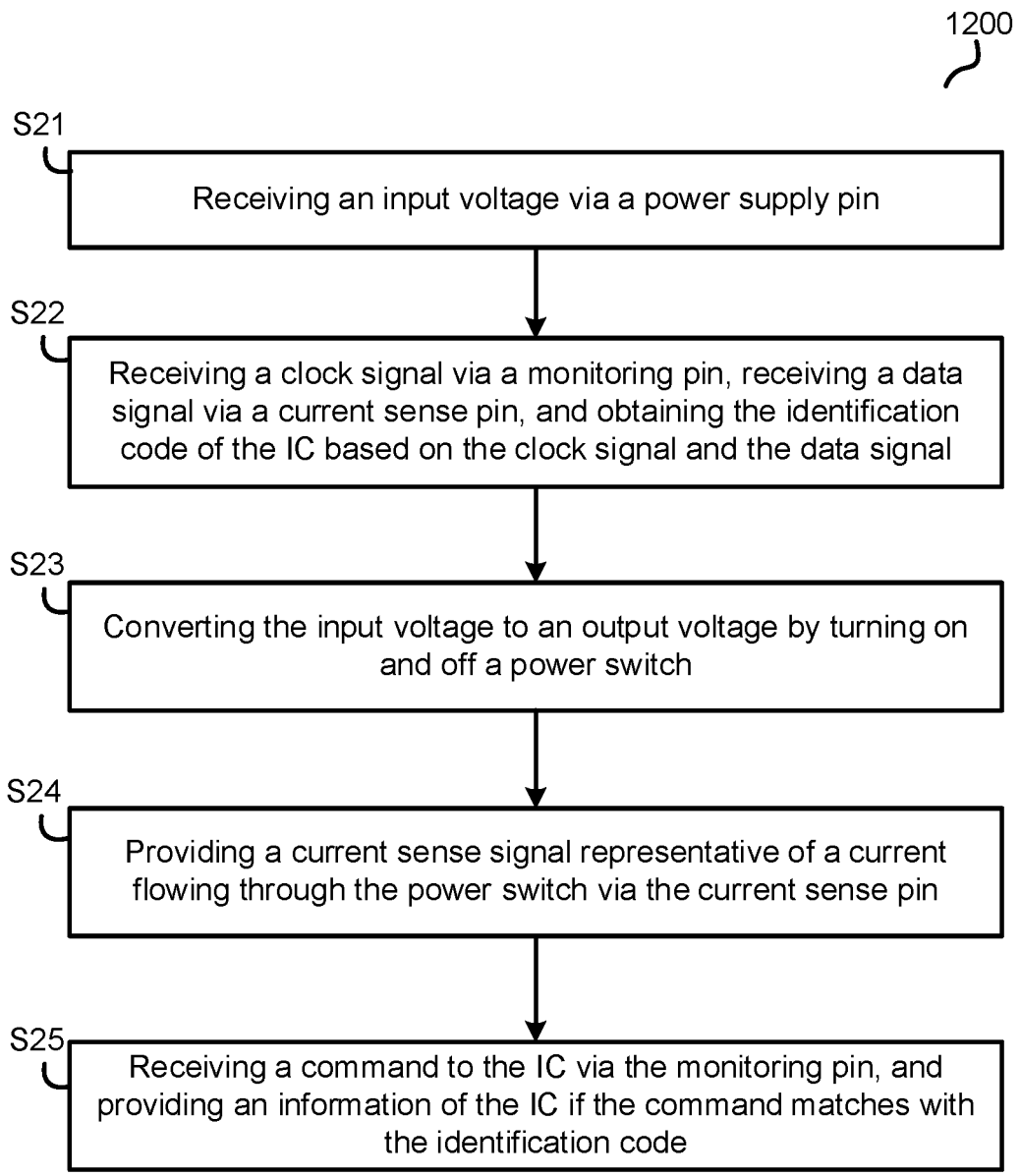
FIG. 12 illustrates a method 1200 of assigning an identification code for an integrated circuit (IC) in accordance with another embodiment of the present invention.

FIG. 12 illustrates a method 1200 of assigning an identification code for an integrated circuit (IC) in accordance with another embodiment of the present invention. The IC is configured to provide a phase of a multi-phase voltage converter. The method 1200 comprises steps S21-S25.

At step S21, receiving an input voltage via a power supply pin.

At step S22, receiving a clock signal via a monitoring pin, receiving a data signal via a current sense pin, and obtaining the identification code of the IC based on the clock signal and the data signal. The current sense pin is capable of providing a current sense signal representative of a current flowing through a power switch.

At step S23, converting the input voltage to an output voltage by turning on and off the power switch.

At step S24, providing a current sense signal representative of a current flowing through the power switch via the current sense pin.

At step S25, receiving a command to the IC via the monitoring pin, and reporting an information of the IC if the command matches with the identification code. In one embodiment, the information comprises a temperature signal representative of an individual temperature of the IC.

Note that in the flowchart described above, the functions indicated in the boxes can also occur in a different order than those shown in the figure. Fox example, two boxes presented one after another can actually be executed essentially at the same time, or sometimes in reverse order, depending on the specific functionality involved.

Obviously many modifications and variations of the present invention are possible in light of the above teachings. It is therefore to be understood that within the scope of the appended claims the invention may be practiced otherwise than as specifically described. It should be understood, of course, the foregoing invention relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What we claim is:

1. A multi-phase voltage converter, comprising:
   a plurality of integrated circuits (ICs) that each provides a phase of the multi-phase voltage converter to convert an input voltage to an output voltage, each of the plurality of ICs comprising a power switch, a monitoring pin, a power supply pin, and a current sense pin, the current sense pin is capable of providing a current sense signal representative of a current flowing through the power switch, wherein the power supply pin is configured to receive the input voltage, and the power switch is configured to be turned ON and OFF to convert the input voltage to the output voltage; and
a controller, having a monitoring pin and a plurality of multiplex pins, the monitoring pin of the controller is coupled to the monitoring pin of each of the plurality of ICs, and the plurality of multiplex pins are coupled to the current sense pin of the plurality of ICs; wherein
the controller is capable of providing a clock signal via the monitoring pin of the controller, and providing a plurality of data signals via the plurality of multiplex pins, and the controller is configured to assign a plurality of identification codes for the plurality of ICs based on the clock signal and the plurality of data signals.

2. The multi-phase voltage converter of claim 1, wherein the monitoring pin of each of the plurality of ICs is capable of providing a temperature signal representative of an individual temperature.

3. The multi-phase voltage converter of claim 1, wherein the controller is further configured to provide a command via the monitoring pin to all of the plurality of ICs, and the command is capable of selecting one of the plurality of ICs to report an information.

4. The multi-phase voltage converter of claim 1, wherein after assigning the plurality of identification code, the controller is further configured to send a command via the monitoring pin of the controller to all of the plurality of ICs.

5. The multi-phase voltage converter of claim 4, wherein if the command matches with a first predetermined code, then all of the plurality of ICs stop reporting an information back to the controller, and the controller is configured to detect if a bus coupled to the monitoring pin of the controller is abnormal.

6. The multi-phase voltage converter of claim 4, wherein if the command matches with an identification code of one of the plurality of ICs, then the one of the plurality of ICs is configured to report an information back to the controller, while other of the plurality of ICs stop reporting the information.

7. The multi-phase voltage converter of claim 4, wherein if the command matches with a second predetermined code, then all of the plurality of ICs are configured to report an information back to the controller.

8. A method of assigning identification codes for a plurality of integrated circuits (ICs), wherein each of the plurality of ICs is configured to provide a phase of a multi-phase voltage converter, the method comprising:
providing a clock signal via a monitoring pin;
providing a plurality of data signals via a plurality of multiplex pins, the plurality of multiplex pins are capable of receiving a plurality of current sense signals representative of a plurality of current flowing through the plurality of ICs; and
assigning a plurality of identification codes for the plurality of ICs based on the clock signal and the plurality of data signals.

9. The method of claim 8, further comprising providing a command to the plurality of ICs via the monitoring pin to execute at least one of the following program:
(1) calling a specific one of the plurality of ICs to report an information;
(2) calling all of the plurality of ICs to report the information; and
(3) stopping all of the plurality of ICs to report the information, and detecting if a bus coupled to the monitoring pin is abnormal.

10. The method of claim 9, further comprising forcing the monitoring pin to be at a first status before providing the command, and forcing the monitoring pin to be at a second status for a time period after providing the command.

11. The method of claim 8, further comprising forcing the monitoring pin and the plurality of multiplex pins to be at a first status before assigning the plurality of identification codes, and forcing the monitoring pin and the plurality of multiplex pins to be at a second status for a time period after assigning the plurality of identification codes.

12. The method of claim 11, further comprising releasing the monitoring pin and the plurality of multiplex pins when the time period is expired.

13. An integrated circuit (IC), comprising:
a power supply pin, configured to receive an input voltage;
a power switch, configured to be turned ON and OFF to convert the input voltage to an output voltage;
a monitoring pin, being capable of receiving a clock signal; and
a current sense pin, being capable of providing a current sense signal representative of a current flowing through the power switch, and the current sense pin is further capable of receiving a data signal; wherein
the IC is configured to be assigned an identification code based on the clock signal and the data signal.

14. The IC of claim 13, wherein the monitoring pin is further capable of receiving a command, and reporting an information if the command matches with the identification code.

15. The IC of claim 14, wherein the information comprises an individual temperature of the IC.

16. A controller for a multi-phase voltage converter, comprising:
a monitoring pin, coupled to a plurality of integrated circuits (ICs), each of the plurality of ICs provides a phase of the multi-phase voltage converter, and the monitoring pin is capable of providing a clock signal to all of the plurality of ICs; and
a plurality of multiplex pins, each of the plurality of multiplex pins is coupled to one of the plurality of ICs to receive a current sense signal representative of a current flowing through the one of the plurality of ICs;
wherein the plurality of multiplex pins are capable of providing a plurality of data signals to the plurality of ICs, and the controller is configured to assign a plurality of identification codes for the plurality of ICs based on the clock signal and the plurality of data signals.

17. The controller of claim 16, wherein the controller is configured to force the monitoring pin and the plurality of multiplex pins to be at a first status before sending the clock signal and the plurality of data signals.

18. The controller of claim 16, wherein the controller is configured to force the monitoring pin and the plurality of multiplex pins to be at a second status for a time period after sending the clock signal and the plurality of data signals.

19. The controller of claim 16, wherein the controller is further capable of providing a command via the monitoring pin to all of the plurality of ICs to execute one of the following program:
(1) calling a specific one of the plurality of ICs to report an information back to the controller;
(2) calling all of the plurality of ICs to report the information back to the controller; and
(3) stopping all of the plurality of ICs to report the information back to the controller, and detecting if a bus coupled to the monitoring pin is abnormal.

20. The controller of claim 16, further comprising:
a pull down circuit, coupled between the monitoring pin and a reference ground; and
a pull up circuit, coupled between the monitoring pin and a voltage source; wherein
the controller is configured to pull in and out the pull down circuit and the pull up circuit to detect if a bus coupled to the monitoring pin is abnormal.

\* \* \* \* \*